UNITED STATES PATENT OFFICE.

WOLFGANG WEICHARDT, OF BERLIN, GERMANY.

ANTITOXIN FOR FATIGUE AND PROCESS OF MAKING THE SAME.

No. 809,347. Specification of Letters Patent. Patented Jan. 9, 1906

Application filed January 18, 1904. Serial No. 189,489. (Specimens.)

*To all whom it may concern:*

Be it known that I, WOLFGANG WEICHARDT, doctor of medicine, a subject of the German Emperor, residing at Berlin, Germany, (whose post-office address is 114 Lutherstrasse, Berlin, Germany,) have invented an Antitoxin for Fatigue and Process of Making the Same, (for which I have applied for a patent in Germany on the 6th day of February, 1903,) of which the following is a specification.

I have discovered as a result of numerous experiments that fatigue of the human and animal body (not being exhaustion) is produced by certain toxic substances which are hardly traceable in the normal (unfatigued) organism, but which are always and in considerable quantity found in the fatigued organism. Their existence may be proved by means of experiments, for it was found that animals injected with sterile muscle plasm taken from strongly-fatigued animals of the same kind became tired or sleepy and that they died after a period of twenty to forty hours, while animals treated in the same manner with the same quantity of muscle plasm from unfatigued animals did not become tired and remained alive. These toxins of fatigue, like all poisons produced directly from the living protoplasm, cannot be accurately characterized by their chemical composition. They will not pass through an ordinary dialyzer, which is probably due to their large molecular structure. They will not resist heating and become inactive after two hours when heated to only 56° centigrade. The toxins of fatigue are saturated or rendered harmless by antitoxins produced in the organs of the body when at rest, chiefly during normal sleep. In the blood, which is the vehicle of the antitoxin, an appreciable quantity of toxins of fatigue is only found in cases of extreme fatigue.

My process consists in the production of compounds or pharmaceutical preparations which contain the antitoxins mentioned above, and consequently have the effect when introduced into the fatigued body or human organism that the same recovers its normal condition in a comparatively short time without requiring any sleep. For this purpose muscular fatigue is induced in horses or other suitable animals, preferably up to the commencement of yawning fits or spasms, after which they are bled to deprive the muscles of blood, the muscles are cut out, while taking rigid aseptic precautions, after which they are maintained at a temperature of about 37° centigrade for several hours, then pounded in a sterilized mortar. Then the muscle pulp thus obtained is pressed and relieved of superfluous liquid in a press which has been previously sterilized. Suitable liquids, such as blood serum or a physiological solution of table-salt, may be added to and mixed with the muscle paste before it is pressed. Instead of muscle plasm, blood plasm, or plasm from other organs, or excretions or secretions of the fatigued animals, such as their milk, may be used, inasmuch as the said organs or products likewise contain the toxin. The plasm thus obtained is filtered through earthenware filters and injected into small animals, such as guinea pigs or mice, to test it as regards the quantity of toxins of fatigue contained in the plasm. If the quantity is found sufficient, the plasm is repeatedly injected into suitable animals—such as rabbits, goats, and horses—for obtaining the antitoxin. After a short time the materials constituting the organs of the animals thus treated or the products of the same, such as their milk, and especially the blood serum, which is comparatively rich in antitoxins adapted to rapidly neutralize or render harmless the toxins of fatigue, are suitable for use in an appropriate form by introducing them into the alimentary circulation of the human body—for instance, as an injecting liquid, or (because the antitoxins pass the stomach and intestines without decomposition) as an addition to enemas, or as an admixture to articles of food or stimulants, or in the shape of pills, tabloids, or similar preparations.

The antitoxin, which like the toxin cannot be accurately characterized by its chemical composition, is less subject to change than the toxin. For instance, it penetrates through the walls of the stomach without experiencing any material reduction of its efficiency.

As mentioned before, the blood is the seat of the antitoxins and normally possesses a certain quantity of antitoxins which are capable of saturating the toxins of fatigue. Consequently the process may be modified by using blood serum or plasm obtained from unfatigued animals directly for neutralizing or rendering harmless the toxins of fatigue— that is to say, by directly introducing such serum or plasm in a suitable form into the fatigued organism.

What I claim is—

1. The process for obtaining a substance adapted to neutralize and render inoperative the toxin arising in the human organism in cases of fatigue, which consists in producing in animals intense fatigue, obtaining from the same toxin accumulated in their organism in consequence of fatigue, by removing constituent parts containing the toxin, injecting the said toxin into other animals and subsequently abstracting suitable parts of their organism, substantially as described.

2. The process for obtaining a substance adapted to neutralize or render inoperative the toxin arising in the human body in cases of fatigue, which consists in producing in animals intense muscular fatigue, obtaining from the same toxin accumulated in their organism in consequence of fatigue, by removing organic plasm from the animal, injecting the said toxin into other animals and subsequently abstracting suitable liquid products of their organism, substantially as described.

3. The process for obtaining a substance adapted to neutralize and render inoperative the toxin arising in the human body in cases of fatigue, which consists in producing muscular fatigue in animals, bleeding the fatigued animals, taking muscular tissues from the same, maintaining it at about 37° centigrade for several hours, grinding it to pulp, pressing out superfluous liquid, filtering the plasm thus obtained, injecting it into suitable animals, and allowing it to act, then bleeding the animals thus treated and extracting the serum from the blood thus obtained, substantially as described.

4. As a new substance, a pharmaceutical preparation containing an antitoxin against the poisons arising in the human and animal organism in cases of fatigue, which preparation consists of the concentrated serum of animals treated with toxins of fatigue taken from the fatigued animals and which has the property of neutralizing or destroying these toxins, substantially as described.

In witness whereof I have signed this specification in the presence of two subscribing witnesses.

WOLFGANG WEICHARDT.

Witnesses:
LUDWIG WENGHÖFFER,
CLARA KOHN.